(12) United States Patent
Tseng et al.

(10) Patent No.: US 8,260,219 B2
(45) Date of Patent: Sep. 4, 2012

(54) NETWORK COMMUNICATION DEVICE AND METHOD FOR DETECTING ABNORMAL LOAD

(75) Inventors: Li-Bin Tseng, Taipei Hsien (TW); Dan-Dan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 161 days.

(21) Appl. No.: 12/952,158

(22) Filed: Nov. 22, 2010

(65) Prior Publication Data

US 2012/0075020 A1    Mar. 29, 2012

(30) Foreign Application Priority Data

Sep. 28, 2010    (CN) .......................... 2010 1 0294662

(51) Int. Cl.
*H03C 1/52* (2006.01)
*H04B 1/02* (2006.01)

(52) U.S. Cl. .... 455/107; 455/91; 455/114.3; 455/115.1; 455/115.4

(58) Field of Classification Search ............... 455/550.1, 455/91, 107, 114.3, 115.1, 115.4, 117, 124, 455/127.1, 127.3, 129
See application file for complete search history.

(56) References Cited

U.S. PATENT DOCUMENTS

| 6,148,220 A * | 11/2000 | Sharp et al. .................. 455/572 |
| 6,215,987 B1 * | 4/2001 | Fujita ......................... 455/127.3 |
| 6,240,279 B1 * | 5/2001 | Nitta et al. ................. 455/127.2 |

* cited by examiner

*Primary Examiner* — Tuan Pham
(74) *Attorney, Agent, or Firm* — Altis Law Group, Inc.

(57) ABSTRACT

A network communication device includes a processor, an amplifier circuit, a matching circuit including a transmitting route and a coupling route, a storage module, and a detection and control module. The network communication device generate electronic signals, and outputs the electronic signals to a load via the transmitting route after the electronic signals being amplified and matched. Then the network communication device detects output signals and reflection signals of the coupling route to calculate a safety parameter accordingly, compares the calculated safety parameter with one or more safety parameter thresholds, and generates control signals to control the amplifier circuit. The network communication device determines if the load is abnormal according to the control signals and generates load abnormal signals if the load is abnormal.

16 Claims, 5 Drawing Sheets

$$\begin{bmatrix} V1- \\ V2- \\ V3- \\ V4- \end{bmatrix} = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} \begin{bmatrix} V1+ \\ V2+ \\ V3+ \\ V4+ \end{bmatrix}$$

(a)

$$\begin{bmatrix} V1- \\ V2- \\ V3- \\ V4- \end{bmatrix} = \begin{bmatrix} 0 & S_{21} & S_{31} & S_{41} \\ S_{21} & 0 & S_{32} & S_{42} \\ S_{31} & S_{32} & 0 & S_{43} \\ S_{41} & S_{42} & S_{43} & 0 \end{bmatrix} \begin{bmatrix} V1+ \\ V2+ \\ 0 \\ 0 \end{bmatrix}$$

NETWORK COMMUNICATION DEVICE AND METHOD FOR DETECTING ABNORMAL LOAD

BACKGROUND

1. Technical Field

The disclosure relates to network communication devices, and particularly to a network communication device capable of detecting an abnormal load.

2. Description of Related Art

Elements of network communication devices are modularized in order to decrease manufacture costs. For example, in wireless communication devices, modularized antennas are assembled to the wireless communication devices. If the modularized antennas are wrongly assembled or loosely connected, strong signals are reflected from the modularized antenna to amplifiers connected to the modularized antennas, which damage the amplifiers.

BRIEF DESCRIPTION OF THE DRAWINGS

FIG. 5 is a schematic diagram of scatter matrix.

DETAILED DESCRIPTION

As used herein, the term "module" may comprise computerized code in the form of one or more programs that are stored in a storage unit (or memory). The computerized code includes instructions that are executed by at least one processor to provide functions for modules. The term "matching", "impedance matching" are the practice of designing input impedance of an electrical load or output impedance of corresponding signal source of the electrical load in order to maximize power transfer and minimize reflections from the electrical load.

"Reflection" is the change in direction of a wavefront at an interface between two different media so that the wavefront returns into the medium from which it originated. "Scattering" is a general physical process where some forms of radiation, such as light, sound, or moving particles, are forced to deviate from a straight trajectory by one or more localized non-uniformities in the medium through which they pass.

Figure 1:
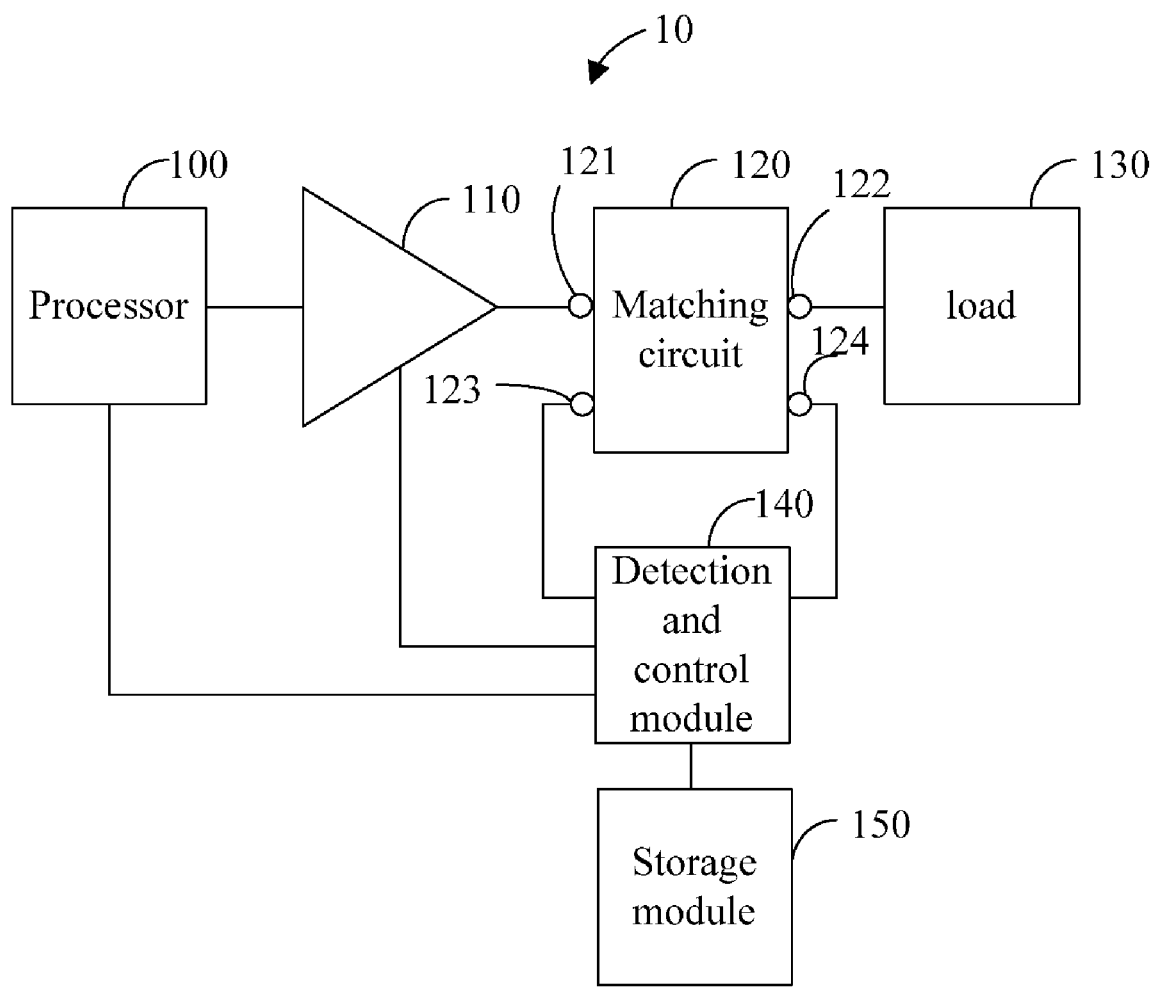
FIG. 1 is a schematic diagram of one embodiment of a network communication device as disclosed.

FIG. 1 is a schematic diagram of one embodiment of a network communication device 10 as disclosed. In one embodiment, the network communication device 10 includes load 130, and can detect if the load 130 is abnormal when powered and operating, to protect and/or notify users. In an exemplary embodiment, the network communication device 10 may be a wireless communication device, such as, wireless access point, and the load 130 may be an antenna. The wireless communication device detects if the antenna is abnormal, such as, being loosely connected or wrongly assembled, and protects and/or alarms if the antenna is abnormal. In alternative embodiments, the network communication device 10 may be wired communication device, such as, set top boxes, and the load 130 may be display devices, such as, TV.

As shown in FIG. 1, the network communication device 10 includes a processor 100, an amplifier circuit 110, a matching circuit 120, a detection and control module 140, and a storage module 150. The processor 100 implements working tasks of the network communication device 10, and generates and outputs electronic signals. In one embodiment, the electronic signals include radio frequency signals, video signals, or audio signals. The amplifier circuit 110 amplifies the electronic signals output from the processor 100. In one embodiment, the amplifier circuit 110 may be a multi stage amplifier, which selects a suitable gain stage to amplify the electronic signals according to power of the electronic signals and status of the load 130.

The matching circuit 120 matches impedance of the amplified electronic signals to output matched signals to load 130. In one embodiment, the matching circuit 120 may be a matching circuit with four ports 121, 122, 123, and 124. The port 121 is connected to an output of the amplifier circuit 110, and the port 122 is connected to the load 130. The port 123 is in a same side of the matching circuit 120 with the port 121, the port 124 is in a same side of the matching circuit 120 with the port 122, and the ports 123 and 124 are both connected to the detection and control module 140. In one embodiment, a route between the ports 121 and 122 is a transmitting route, and a route between the ports 123 and 124 is a coupling route.

Generally, the network communication device 10 can detect impedance of signal source and the load 130 to calculate a reflection coefficient $\Gamma$, and can determine if the load 130 is abnormal according to the reflection coefficient $\Gamma$. However, when the network communication device 10 is running, it is difficult to detect the impedance of the signal source and the load 130. Therefore, a safety parameter K is determined in one embodiment of the invention. Relations between the safety parameter K and the reflection coefficient $\Gamma$ are described below with referring to FIG. 2.

Figure 2:
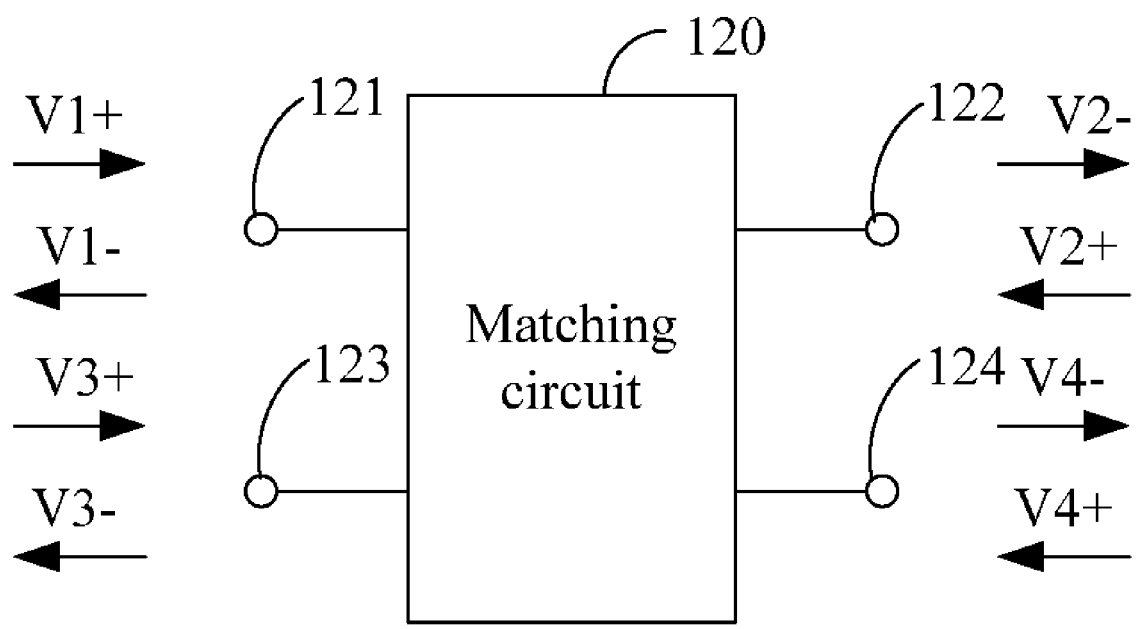
FIG. 2 is a schematic diagram of one embodiment of an equivalent matching model of a matching circuit of a network communication device.

FIG. 2 is a schematic diagram of one embodiment of an equivalent matching model of the matching circuit 120, where unmatched parts are drawn to the amplifier circuit 110, the load 130, and the detection and control module 140 all connected to the matching circuit 120. The amplified electronic signals from the amplifier circuit 110 are input to the port 121, reflection signals from the load 130 are input to the port 122, and the amplified electronic signals and the reflection signals are both scattered and reflected to the ports 123 and 124 of the coupling route. In an exemplary embodiment, input signals and output signals of the port 121 are respectively defined as V1+ and V1−, input signals and output signals of the port 122 are respectively defined as V2+ and V2−, input signals and output signals of the port 123 are respectively defined as V3+ and V3−, and input signals and output signals of the port 124 are respectively defined as V4+ and V4−. A scatter matrix of the matching circuit 120 is shown is FIG. 5(a), and scatter parameters in the scatter matrix can be measured in advance by simulation tools.

Self reflection of the ports 121 to 124 is infinitesimal and can be omitted after matching, that is, $S_{11}$, $S_{22}$, $S_{33}$, and $S_{44}$ are nearly to be 0. The ports 123 and 124 nearly have no inputs, therefore V3+ and V4+ are nearly to be 0. In addition, if the matching has no loss, the scatter matrix is a symmetrical matrix, that is, $S_{ij}=S_{ji}$. Therefore, the scatter matrix shown in FIG. 5(a) is converted to a converted scatter matrix as shown in FIG. 5(b).

Coordinating the converted scatter matrix shown in FIG. 5(b), following equations can be obtained: V1−=(V2+)×$S_{21}$, V2−=(V1+)×$S_{21}$, V3−=(V1+)×$S_{31}$+(V2+)×$S_{32}$, and V4−=(V1+)×$S_{41}$+(V2+)×$S_{42}$. Because V2+=V2−×$\Gamma$, the above equations are coordinated to be: $V1-=(V1+)\times\Gamma S_{21}^2$, $V3-=(V1+)\times(S_{31}+S_{32}\times\Gamma S_{21})$, and $V4-=(V1+)\times(S_{41}+S_{42}\times\Gamma S_{21})$.

V3− is defined as reflection signals of the coupling route, and V4− is defined as output signals of the coupling route. The amplified electronic signals are input to the port 121, and the reflection signals from the load 130 are input to the port 122, and the amplified electronic signals and the reflection signals are both scattered and reflected to the ports 123 and 124 of the coupling route. Therefore, the safety parameter K is defined to represent the reflection coefficient Γ, thus, representing states of the load 130, where $K=V3-/V4-=(S_{31}+S_{32}\times|\Gamma|S_{21})/(S_{41}+S_{42}\times|\Gamma|S_{21})$.

Defining maximum reflection signals as Vrmax, which do not damage the amplifier circuit 110, when the amplifier circuit 110 reaches the maximum output power, $Vrmax=(V1-)max=(V1+)max\times\Gamma max S_{21}^2$. That is, a absolute value of a maximum reflection coefficient $|\Gamma|=|Vrmax/((V1+)max\times S_{21}^2.)|\leq 1$, which does not damage the amplifier circuit 110. In addition, defining a normal reflection coefficient as Γmin when the amplifier circuit 110 works normally, which is determined by a system error. Thus, when a absolute value of an actual reflection coefficient $|\Gamma|\geq|\Gamma max|$, it represents that the load 130 is abnormal, such as, shorted or opened, and cannot work normally. At this time, the reflection signals from the load 130 may damage the amplifier circuit 110 immediately. When the absolute value of the actual reflection coefficient $|\Gamma min|\leq|\Gamma|<|\Gamma max|$, it represents that the load 130 is abnormal but works. The reflection signals from the load 130 may not damage the amplifier circuit 110 immediately, but shortens life of the amplifier circuit 110, which shortens life of the network communication device 10. When the absolute value of the actual reflection coefficient $|\Gamma|<|\Gamma min|$, it represents that the load 130 is normal, and the network communication device 10 works normally.

Therefore, a maximum safety parameter $Kmax=(S_{31}+S_{32}\times|\Gamma max|S_{21})/(S_{41}+S_{42}\times|\Gamma max|S_{21})$, and a minimum safety parameter $Kmin=(S_{31}+S_{32}\times|\Gamma min|S_{21})/(S_{41}+S_{42}\times|\Gamma min|S_{21})$. Similarly, when an actual safety parameter K of the network communication device 10 is greater than or equal to the maximum safety parameter Kmax, it represents that the load 130 is abnormal and cannot work normally, and the reflection signals from the load 130 may damage the amplifier circuit 110 immediately. When the actual safety parameter K is less than the maximum safety parameter Kmax and greater than or equal to the minimum safety parameter Kmin, it represents that the load 130 is abnormal but works, and the reflection signals from the load 130 may no damage the amplifier circuit 110 immediately but shortens the life of the amplifier circuit 110 and the network communication device 10. When the actual safety parameter K is less than the minimum safety parameter Kmin, it represents that the load 130 works normally, and the network communication device 10 works normally.

The storage module 150 stores a safety parameter threshold table recording one or more safety parameter thresholds. In one embodiment, the one or more safety parameter thresholds in the safety parameter threshold table include the maximum safety parameter Kmax and the minimum safety parameter Kmin.

The detection and control module 140 is electrically connected to the coupling route of the matching circuit 120 and the storage module 150, and detects the output signals V4− and the reflection signals V3− of the coupling route and calculates the safety parameter K according to the output signals and the reflection signals of the coupling route. In one embodiment, the detection and control module 140 detects voltage of the output signals V4− and the reflection signals V3− of the coupling route, and calculates the actual safety parameter K according to the equation $K=V3-/V4-$. The detection and control module 140 detects signals of the coupling route to calculate the safety parameter K, which is easy to achieve and may not influence transmitting quality of the transmitting route. The detection and control module 120 further compares the calculated safety parameter K with the one or more safety parameter thresholds in the safety parameter threshold table, and generates control signals based on the comparison accordingly to control the amplifier circuit 110.

The processor 100 further determines if the load 130 is abnormal according to the control signals, and generates load abnormal signals if the load 130 is abnormal. In one embodiment, the load abnormal signals include display signals and/or alarm signals. The processor 100 drives display devices to display load abnormal or similar content via the display signals, or drives light emitting diodes to light via the display signals, or drives alarm device to alarm via the alarm signals, to notify users.

In one embodiment, the detection and control module 140 compares the calculated safety parameter K with the maximum safety parameter Kmax and the minimum safety parameter Kmin in the safety parameter threshold table. If the calculated safety parameter K is greater than or equal to the maximum safety parameter Kmax, it represents that the load 130 is abnormal and cannot work normally and the reflection signals from the load 130 may damage the amplifier circuit 110 immediately, thus, the detection and control module 140 correspondingly generates first control signals, and controls the amplifier circuit 120 to be turned off to protect the amplifier circuit 120. At this time, the processor 100 determines that the load 130 is in a first load abnormal state, and generates first load abnormal signals according to the first control signals to notify the users. In one embodiment, the first load abnormal state includes that the load 130 cannot work normally, and the amplifier circuit 110 is turned off.

If the calculated safety parameter K is greater than or equal to the minimum safety parameter Kmin and less than the maximum safety parameter Kmax, it represents that the load 130 is abnormal but can work and the reflection signals from the load 130 may not damage the amplifier circuit 110 immediately but may shorten the life of the amplifier circuit 110 and the network communication device 10, thus, the detection and control module 140 correspondingly generates second control signals, but does not control the amplifier circuit 120 to be turned off. At this time, the processor 100 determines that the load 130 is in a second load abnormal state, and generates second load abnormal signals according to the second control signals to notify the users. In one embodiment, the second load abnormal state includes that the load 130 works, but the life of the amplifier circuit 110 and the network communication device 10 is shortened.

In one embodiment, the first control signals may be high level logic signals, and the second control signals may be low level logic signals. In alternative embodiment, the first control signals may be low level logic signals, and the second control signals may be high level logic signals. The first load abnormal signals and the second load abnormal signals may be different display signals and alarm signals, which make the users to know different load abnormal states.

If the calculated safety parameter K is less than the minimum safety parameter Kmin, it represents that the load 130 is normal, and the network communication device 10 works normally, therefore, the detection and control module 140 and the processor 100 do not control or display abnormal content.

Figure 3:
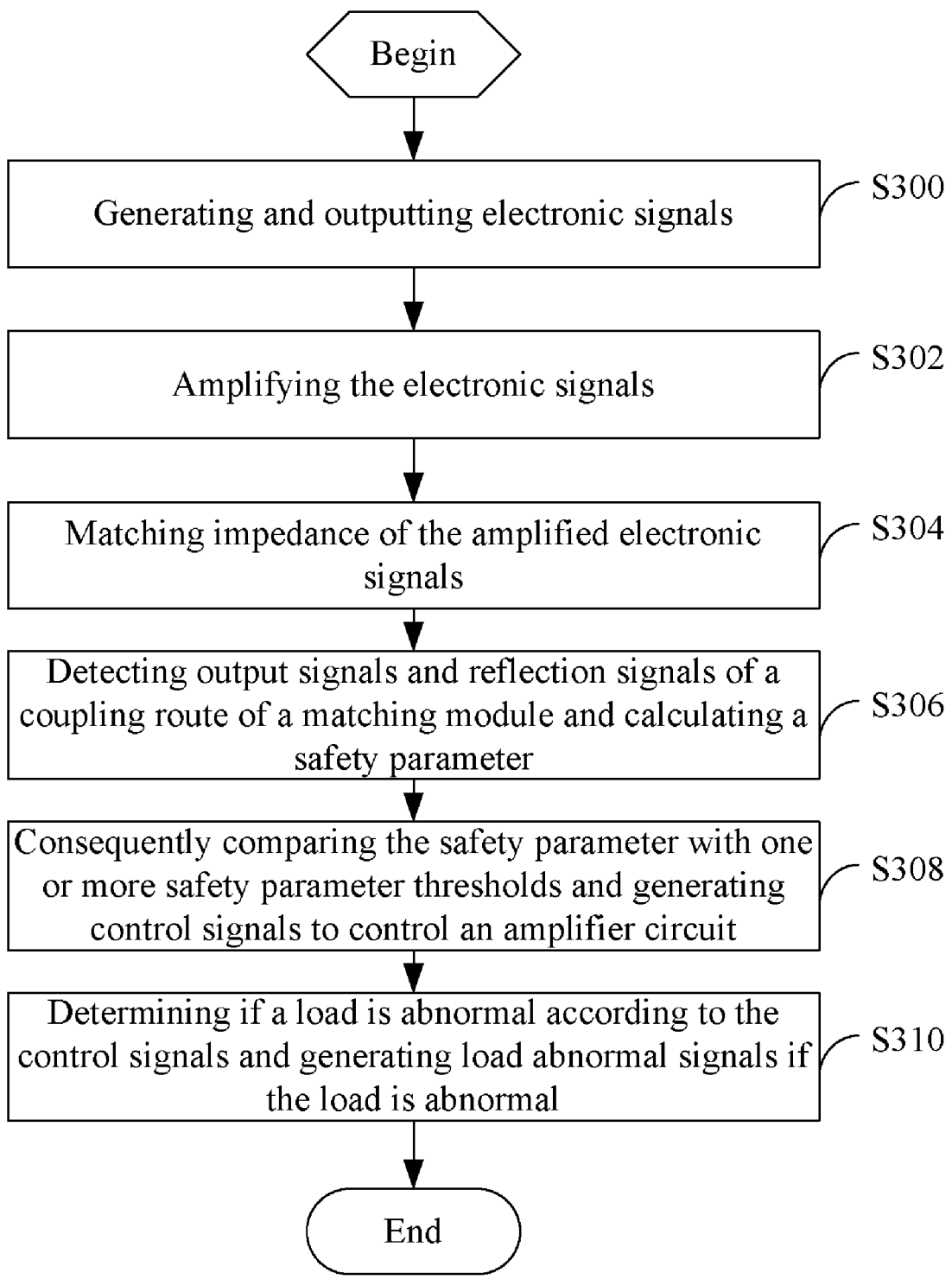
FIG. 3 is a flowchart of a first embodiment of a method for detecting an abnormal load as disclosed.

FIG. 3 is a flowchart of one embodiment of a method for detecting an abnormal load as disclosed. In step S300, the processor 100 generates and outputs electronic signals. In one embodiment, the electronic signals include radio frequency signals or video signals or audio signals. In step S302, the amplifier circuit 110 amplifies the electronic signals. In step S304, the matching circuit 120 matches impedance of the amplified electronic signals, and outputs matched electronic signals to the load 130 via the transmitting route of the matching circuit 120. In step S306, the detection and control module 140 detects the output signals V4– and the reflection signals V3– of the coupling route of the matching circuit 120, and calculates the safety parameter K accordingly. In step S308, the detection and control module 140 compares the calculated safety parameter K with the one or more safety parameter thresholds in the safety parameter threshold table, and generates control signals based on the comparison to control the amplifier circuit 110. In step S310, the processor 100 determines if the load 130 is abnormal according to the control signals, and generates load abnormal signals if the load 130 is abnormal, to notify the users.

Figure 4:
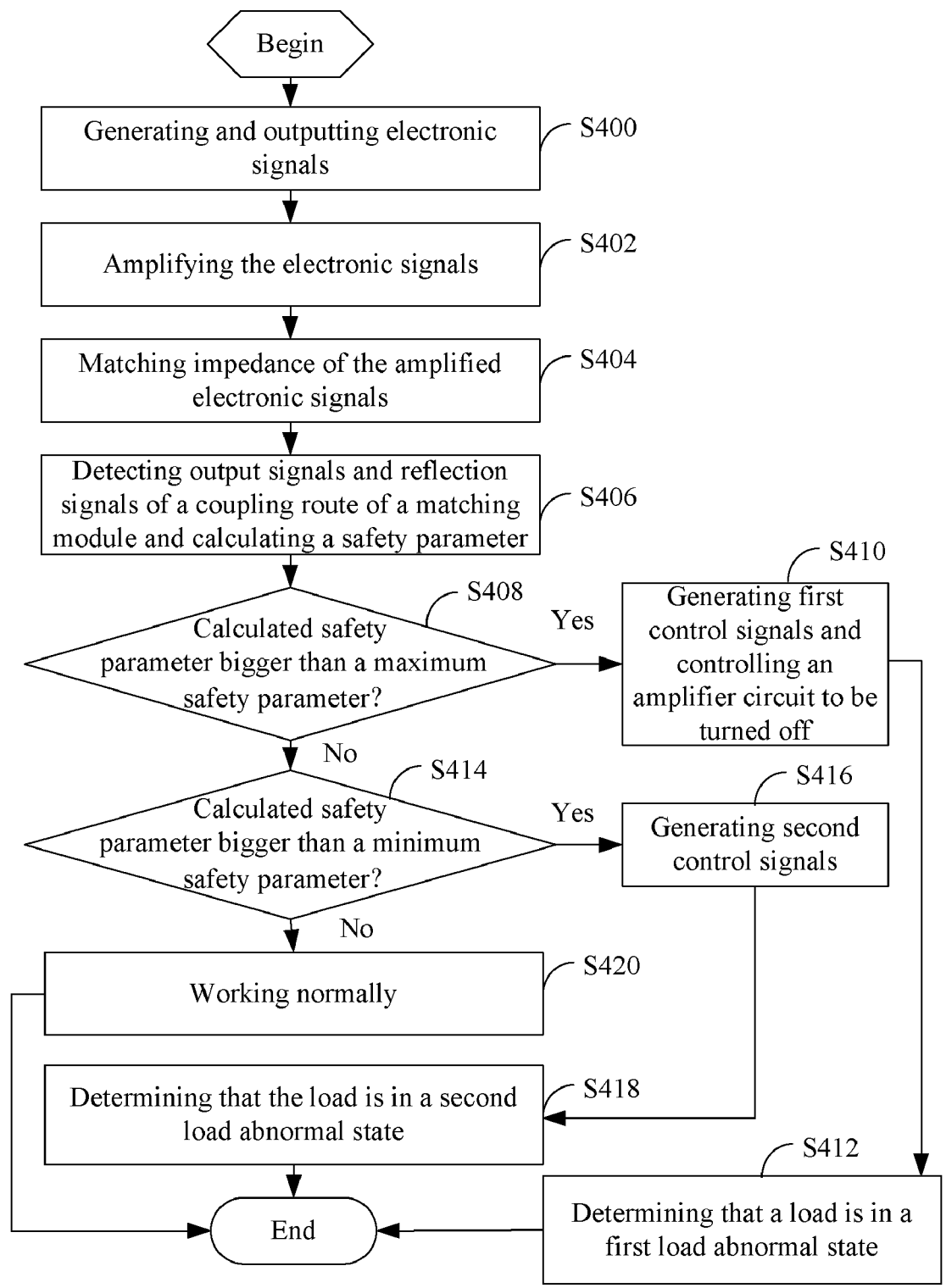
FIG. 4 is a flowchart of a second embodiment of a method for detecting an abnormal load as disclosed.

FIG. 4 is a flowchart of another embodiment of a method for detecting an abnormal load as disclosed. In step S400, the processor 100 generates and outputs electronic signals. In one embodiment, the electronic signals include radio frequency signals or video signals or audio signals. In step S402, the amplifier circuit 110 amplifies the electronic signals. In step S404, the matching circuit 120 matches impedance of the amplified electronic signals, and outputs matched electronic signals to the load 130 via the transmitting route of the matching circuit 120. In step S406, the detection and control module 140 detects the output signals V4– and the reflection signals V3– of the coupling route of the matching circuit 120, and calculates the safety parameter K accordingly. In step S408, the detection and control module 140 consequently compares the calculated safety parameter K with the maximum safety parameter Kmax to determine if the calculated safety parameter K is greater than or equal to the maximum safety parameter Kmax. If the calculated safety parameter K is greater than or equal to the maximum safety parameter Kmax, it represents that the load 130 is abnormal and cannot work normally and reflection signals from the load 130 may damage the amplifier circuit 110, thus in step S410, the detection and control module 140 generates first control signals to control the amplifier circuit 110. In step S412, the processor 100 determines that the load 130 is in the first load abnormal state according to the first control signals, and generates first load abnormal signals. In one embodiment, the first load abnormal state includes that the load 130 cannot work normally, and the amplifier circuit 110 is turned off.

If the calculated safety parameter K is less than the maximum safety parameter Kmax, in step S414, the detection and control module 140 determines if the calculated safety parameter K is greater than or equal to the minimum safety parameter Kmin If the calculated safety parameter K is greater than or equal to the minimum safety parameter Kmin, it represents that the load 130 is abnormal but works and the reflection signals from the load 130 may not damage the amplifier circuit 110 immediately but shorten the life of the amplifier circuit 110 and the network communication device 10, thus, in step S416, the detection and control module 140 generates second control signals. In step S418, the processor 100 determines that the load 130 is in the second load abnormal state according to the second control signals, and generates second load abnormal signals. In one embodiment, the second load abnormal state includes that the load 130 can work but the life of the network communication device 10 may be shortened.

If the calculated safety parameter K is less than the minimum safety parameter Kmin, in step S420, the network communication device 10 works normally.

The network communication device 10 and the method for detecting an abnormal load calculate the safety parameter K to compare with the one or more safety parameter thresholds in the safety parameter threshold table, determines if the load is abnormal accordingly, and actively notify the users if the load is abnormal, which avoids damage due to abnormal operation of long time. In addition, the network communication device 10 and the method for detecting an abnormal load detect signals of the coupling route to calculate the safety parameter K, which is easy to achieve and may not influence transmitting quality of the transmitting route.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A network communication device, comprising:
    a processor, to implement working tasks of the network communication device and generate and output electronic signals;
    an amplifier circuit, to amplify the electronic signals output from the processor;
    a storage module, to store a safety parameter threshold table recording one or more safety parameter thresholds;
    a matching circuit, to match impedance of the amplified electronic signals to output matched electronic signals to a load, the matching circuit comprising:
        a transmitting route connecting the amplifier circuit to the load, to output the matched electronic signals to the load; and
        a coupling route; and
    a detection and control module electrically connected to the coupling route of the matching circuit and the storage module, to detect output signals and reflection signals of the coupling route, calculate a safety parameter according to the output signals and the reflection signals, compare the calculated safety parameter with the one or more safety parameter thresholds in the safety parameter threshold table, and generate control signals based on the comparison to control the amplifier circuit;
    wherein the processor determines if the load is abnormal according to the control signals and generates load abnormal signals if the load is abnormal.

2. The network communication device of claim 1, wherein the one or more safety parameters in the safety parameter threshold table comprise a maximum safety parameter and a minimum safety parameter.

3. The network communication device of claim 2, wherein the detection and control module compares the calculated safety parameter with the maximum safety parameter and the minimum safety parameter, and generates first control signals and controls the amplifier circuit to be turned off if the calculated safety parameter is greater than or equal to the maximum safety parameter.

4. The network communication device of claim 3, wherein the processor determines that the load is in a first load abnormal state and generates first load abnormal signals according to the first control signals.

5. The network communication device of claim 4, wherein the first load abnormal state comprises that the load cannot work normally and the amplifier circuit is turned off.

6. The network communication device of claim 2, wherein the detection and control module compares the calculated safety parameter with the maximum safety parameter and the minimum safety parameter, and generates second control signals if the calculated safety parameter is less than the maximum safety parameter and greater than or equal to the minimum safety parameter.

7. The network communication device of claim 6, wherein the processor determines that the load is in a second load abnormal state and generates second load abnormal signals according to the second control signals.

8. The network communication device of claim 7, wherein the second load abnormal state comprises that the load works but life of the network communication device is shortened.

9. A method for detecting an abnormal load, comprising:
generating and outputting electronic signals;
amplifying the electronic signals;
matching impedance of the amplified electronic signals by a matching circuit, and outputting matched electronic signals to a load via a transmitting route of the matching circuit;
detecting output signals and reflection signals of a coupling route of the matching circuit, and calculating a safety parameter accordingly;
comparing the calculated safety parameter with one or more safety parameter thresholds in a safety parameter threshold table, and generating control signals based on the comparison to control an amplifier circuit;
determining if the load is abnormal according to the control signals; and
generating load abnormal signals if the load is abnormal.

10. The method for detecting an abnormal load of claim 9, wherein the one or more safety parameter thresholds in the safety parameter threshold table comprise a maximum safety parameter and a minimum safety parameter.

11. The method for detecting an abnormal load of claim 10, wherein comparing the calculated safety parameter with a safety parameter threshold table recording one or more safety parameter thresholds, and generating control signals based on the comparison to control an amplifier circuit comprises:
determining if the calculated safety parameter is greater than or equal to the maximum safety parameter; and
generating first control signals and controlling the amplifier circuit to be turned off if the calculated safety parameter is greater than or equal to the maximum safety parameter.

12. The method for detecting an abnormal load of claim 11, wherein determining if the load is abnormal according to the control signals; and generating load abnormal signals if the load is abnormal comprises:
determining that the load is in a first load abnormal state according to the first control signals; and
generating first load abnormal signals.

13. The method for detecting an abnormal load of claim 12, wherein the first load abnormal state comprises that the load cannot work normally and the amplifier circuit is turned off.

14. The method for detecting an abnormal load of claim 11, wherein comparing the calculated safety parameter with a safety parameter threshold table recording one or more safety parameter thresholds, and generating control signals based on the comparison to control an amplifier circuit comprises:
determining if the calculated safety parameter is greater than or equal to the minimum safety parameter if the calculated safety parameter is less than the maximum safety parameter; and
generating second control signals if the calculated safety parameter is greater than or equal to the minimum safety parameter.

15. The method for detecting an abnormal load of claim 14, wherein determining if the load is abnormal according to the control signals; and generating load abnormal signals if the load is abnormal comprises:
determining that the load is in a second load abnormal state according to the second control signals; and
generating second load abnormal signals.

16. The method for detecting an abnormal load of claim 15, wherein the second load abnormal state comprises that the load works but life of the network communication device is shortened.

* * * * *